Patented Feb. 16, 1932

1,845,748

UNITED STATES PATENT OFFICE

EDMUND A. HEY, OF ALAMEDA, CALIFORNIA, ASSIGNOR TO ROSEFIELD DEVELOPMENT CORPORATION, OF ALAMEDA, CALIFORNIA, A CORPORATION OF CALIFORNIA

PROCESS FOR PREPARING PICKLES

No Drawing. Application filed December 26, 1929. Serial No. 416,763.

The invention relates in general to the art of preserving, and has particular reference to a process for treating edible substances in preparation for further preserving processes as, for example, in treating cucumbers in preparation for the pickling and flavoring processes.

In most localities engaged in cultivating cucumbers for pickling purposes it has been found that the atmospheric conditions prevailing have a peculiar effect upon the vegetable soon after being removed from the vines which causes the product to bleed at the stem and especially at those large pores found in the warts. Where this condition prevails the pores will show a distinct black spot. This characteristic of the raw material has been a constant perplexity to manufacturers since in the treatment of the stock with either sweet or sour vinegar, any stock that has shown a tendency to shrivel in the brine cure or that has indications of having its pores sealed by the congealing of the sap as above mentioned, will not take the sugar solution readily, and a large percentage will again shrivel, especially in the presence of sweet vinegar.

The object of the present invention is to provide a process for preparing and treating cucumbers after they have been subjected to a brine cure, which process will serve to enhance the appearance of the product through the cleansing of the skin of all foreign matter and the dissolving of the coagulated juices, and which will also serve to facilitate the removal of excess saltiness developed in the brine cure and, consequently, facilitate the introduction of the flavoring liquors, especially those containing quantities of sugar.

In order to more fully appreciate the object of the present invention it is necessary to understand the old process employed in preparing cucumbers for making pickles. The first step in the process is in subjecting the fresh stock to a brine cure which consists in submerging the stock in a salt solution of varying strength, whereupon fermentation from natural causes develops, and lactic acid forms which, together with the salt brine, produces a so-called cure permitting the treated cucumbers to be stored from season to season.

The properly cured stock is then washed in fresh water to extract a fair proportion of the salt. After this washing treatment the pickling process takes place which consists in submerging the stock in an acetic solution of vinegar or in a solution of vinegar slightly sweetened, depending on the character of the finished product desired.

In the commercial application of the above process of washing and pickling a relatively long time is consumed, generally about ninety days, in securing the finished product, which is due mainly to the impermeable physical condition of the outer skin of the cucumbers or raw product. The present invention contemplates a process for materially lessening the time required in preparing and pickling the stock and for securing the objects above mentioned, which consists in submerging the stock after it has been taken from the brine cure in a caustic solution of potassium hydrate and agitating the stock by mechanical means while thus submerged. The submersion and agitation is maintained for such a length of time as will be sufficient for the lye solution to attack the epidermis of the vegetable and render it readily permeable. This step in the process is carried on for a relatively brief period in a tumbling machine, and occurs after the product has been subjected to the brine cure and has therefore been saturated with salt. Although a relatively short time is required for the treatment, no definite restriction on the time can be indicated as one lot of brine stock may require ten minutes, and another lot a much longer time, depending on the nature of the stock. Also, the fact that the caustic solution is preferably heated brings into the process another element which must be regulated to agree with the stock being treated. The maximum effect of the lye solution is, of course, obtained in a very hot solution which, however, need not be resorted to unless the peculiar nature of the stock requires it. It may further be noted that the percentage of potassium hydrate in the solution can be varied to a considerable degree, but the exact strength can only be determined by those familiar with the stock and the results that are desirable. The advantage of thus treating the stock after being cured in the brine solution lies in the fact that, after the pores of the stock are filled with salt, objectionable penetration of the lye solution is prevented. After passing through this treatment, the stock is thoroughly rinsed in fresh water to remove all traces of the lye, and is then subjected to the remainder of the pickling process. Although a solution of potassium hydrate is preferably employed for successfully carrying out the present process, the treatment is not necessarily limited thereto, as caustic soda or other caustic alkali solutions may be also used.

It has been found that the stock, after passing through the treatment thus described, lends itself more readily to the subsequent process required in manufacturing sweet or sour pickles, in that the skin has been completely cleaned of all foreign matter and the coagulated juices or sap thoroughly dissolved. Also, the pores in the skin are opened up so that in subsequent soaking processes the excess saltiness is quickly removed and the stock plumps up fully to its original state as fresh cucumbers. The introduction of the flavoring liquors, and especially sugar solutions, is thus facilitated without the consequent shrivelling of the stock.

It is well known that foreign bacteria are also present in brine stock and are frequently present in such numbers as to destroy the antiseptic action of the lactic acid bacteria, in which event the brine stock becomes soft and ultimately decays, and is a total loss. After treatment through the process described, any bacteria will be completely removed and will not be carried into the finished product, as would be the case if they remained. This cleansing result accomplished by this new process serves to remove all danger of subsequent spoilage in the finished product.

Another advantage of this new process results from the fact that the treatment with the lye solution not only cleans the pores of all foreign matter, but also serves to restore the natural colors in the chlorophyll, which are then set by the subsequent pickling process.

Also, the process is not necessarily limited to the treatment of cucumbers, but may be employed by any manufacturer using vegetables in brine, regardless of the method followed in subsequently introducing the flavoring liquors into the stock.

It has been found that various picking processes are better adapted to the results secured through the lye treatment than others, and especially is this so in those methods employing mechanical means for introducing the flavoring liquors into the stock. In the embodiment of this latter process, the stock and vinegar solution are gradually heated and various amounts of the flavoring matter are added until the maximum strength is reached at the highest temperature to which the treatment is carried. Many desirable features in the finished product are thus obtained by the use of the above pickling process on stock which has first been treated with a caustic solution as described.

I claim:

1. The process of treating pickles which consists in subjecting the brine pickles to a caustic solution for the purpose of opening the pores, and then washing the pickles to remove all traces of the caustic solution prior to the final pickling process.

2. The process of treating pickles which consists in subjecting the brine pickles, while being agitated, to the action of a caustic solution for the purpose of opening the pores, and then washing the pickles to remove all traces of the caustic solution prior to the final pickling process.

3. The process of treating pickles which consists in subjecting the pickles to a salt brine, then submerging them in a caustic solution for the purpose of opening the pores, and finally washing the pickles to remove all traces of the salt and caustic solution.

4. The process of treating pickles which consists in subjecting the pickles to a salt brine, then subjecting the brine stock, while being agitated, to the action of a caustic solution, and then washing the stock in fresh water to remove all traces of the salt and caustic solution.

5. The process of treating fruit and the like which is capable of being preserved by pickling, consisting in subjecting the fruit to a salt brine, then subjecting the brine stock, while being agitated, to the action of a caustic solution, then washing the stock in fresh water, and then subjecting the washed stock to the pickling action of vinegar.

6. The process of treating fruit and the like which is capable of being preserved by pickling, consisting in subjecting the fruit to a salt brine, then subjecting the brine stock to a solution of potassium hydrate, and then washing the stock prior to the final pickling process.

7. The method of preparing pickles for the final pickling process which consists in first subjecting the pickles to a salt brine, then subjecting the brine stock, while being agitated, to a weak solution of potassium hydrate, and then washing the stock, whereby, due to the action of the caustic solution, the removal of the salt is facilitated.

8. The process of treating pickles which consists in subjecting the brine pickles to the action of a hot caustic solution, and then washing the pickles to remove all traces of the caustic solution prior to the final pickling process.

9. The method of preparing pickles for the final pickling process which consists in first subjecting the pickles to a salt brine, then subjecting the brine stock to a hot caustic solution, and then washing the stock to remove all traces of the solution.

10. The method of preparing pickles for the final pickling process which consists in first subjecting the pickles to a salt brine, then subjecting the brine stock, while being agitated, to a hot caustic solution, and then washing the stock to remove all traces of the caustic solution.

11. The method of preparing pickles for the final pickling process which consists in first subjecting the pickles to a salt brine, then subjecting the brine stock, while being agitated, to a hot solution of potassium hydrate, and then washing the stock in fresh water to remove all traces of the caustic solution.

12. The method of preparing pickles for the final pickling process which consists in first subjecting the pickles to a salt brine, then submerging the brine stock in a solution of potassium hydrate, agitating the same while thus submerged by mechanical means, and finally washing the stock in fresh water, whereby the coagulated sap and other surface impurities are dissolved and the surface is rendered permeable due to the action of the caustic solution.

Signed at Alameda, California, this 13th day of December, 1929.

EDMUND A. HEY.